United States Patent
Galdon Cabrera et al.

(10) Patent No.: US 9,816,730 B2
(45) Date of Patent: Nov. 14, 2017

(54) SOLAR RADIATION RECEIVER

(75) Inventors: Carlos Galdon Cabrera, Mirasierra (ES); Carlos Nunez Gonzalez, Mirasierra (ES)

(73) Assignee: Carlos Galdon Cabrera, Mirasierra, Madrid (ES)

( * ) Notice: Subject to any disclaimer, the term of this patent is extended or adjusted under 35 U.S.C. 154(b) by 361 days.

(21) Appl. No.: 14/236,263

(22) PCT Filed: Jul. 30, 2012

(86) PCT No.: PCT/ES2012/070583
§ 371 (c)(1),
(2), (4) Date: May 12, 2014

(87) PCT Pub. No.: WO2013/017721
PCT Pub. Date: Feb. 7, 2013

(65) Prior Publication Data
US 2015/0068514 A1    Mar. 12, 2015

(30) Foreign Application Priority Data

Aug. 1, 2011    (ES) .................................. 201131334

(51) Int. Cl.
*F24J 2/46*    (2006.01)
*F24J 2/07*    (2006.01)
*F24J 2/24*    (2006.01)

(52) U.S. Cl.
CPC .............. *F24J 2/4647* (2013.01); *F24J 2/07* (2013.01); *F24J 2/242* (2013.01); *Y02E 10/41* (2013.01); *Y02E 10/44* (2013.01)

(58) Field of Classification Search
CPC ...................................... F24J 2/07; F24J 2/242
(Continued)

(56) References Cited

U.S. PATENT DOCUMENTS 2,358,476 A * 9/1944 Routh ...................... F24J 2/202
                                                                                 126/667
4,114,597 A    9/1978 Erb
(Continued)

FOREIGN PATENT DOCUMENTS

DE    9206656    8/1992
GB    2463671    3/2010
(Continued)

OTHER PUBLICATIONS

International Search Report, Jul. 1, 2013.

*Primary Examiner* — Avinash Savani
(74) *Attorney, Agent, or Firm* — Greer, Burns & Crain Ltd.

(57) ABSTRACT

A solar radiation panel that has inlet and outlet collectors and a series of conduits that run from the inlet collector to the outlet collector. A working fluid that is heated by solar radiation flows inside the conduits. The panel is a single piece and includes an upper layer, at least one intermediate layer, and a lower layer. The upper layer receives the solar radiation. The at least one intermediate layer is located under the upper layer, and contains the conduits through which the working fluid flows. The lower layer is located under the intermediate layer, and the working fluid inlet and outlet collectors are coupled in said lower layer. The working fluid that is heated in the panel subsequently proceeds to a combustion engine that produces electricity by means of an alternator.

17 Claims, 2 Drawing Sheets

(58) Field of Classification Search
USPC .................................................. 126/663, 662
See application file for complete search history.

(56) References Cited

U.S. PATENT DOCUMENTS

| | | | | |
|---|---|---|---|---|
| 4,136,675 A * | 1/1979 | Karasick | ................... | F24J 2/202 |
| | | | | 126/621 |
| 4,172,441 A * | 10/1979 | Newton | ................... | F24J 2/243 |
| | | | | 126/624 |
| 4,206,746 A * | 6/1980 | Chubb | ................... | B01J 19/127 |
| | | | | 126/651 |
| 4,267,822 A * | 5/1981 | Diamond | ............... | F24J 2/0438 |
| | | | | 126/563 |
| 4,291,681 A * | 9/1981 | Berringer | ................. | F24J 2/201 |
| | | | | 126/673 |
| 4,946,512 A * | 8/1990 | Fukuroi | ................... | E04D 1/24 |
| | | | | 126/622 |
| 6,521,205 B1 | 2/2003 | Beck | | |
| 2009/0095282 A1 | 4/2009 | Cramer | | |
| 2009/0173376 A1* | 7/2009 | Spencer | ............... | B01D 53/261 |
| | | | | 136/248 |
| 2009/0277442 A1* | 11/2009 | Jensen | ....................... | F24J 2/07 |
| | | | | 126/643 |
| 2011/0247282 A1 | 10/2011 | Bankart | | |
| 2013/0276776 A1* | 10/2013 | Te Kamp | ................. | F24J 2/208 |
| | | | | 126/660 |

FOREIGN PATENT DOCUMENTS

WO        9315368        8/1993
WO        9957058        11/1999

* cited by examiner

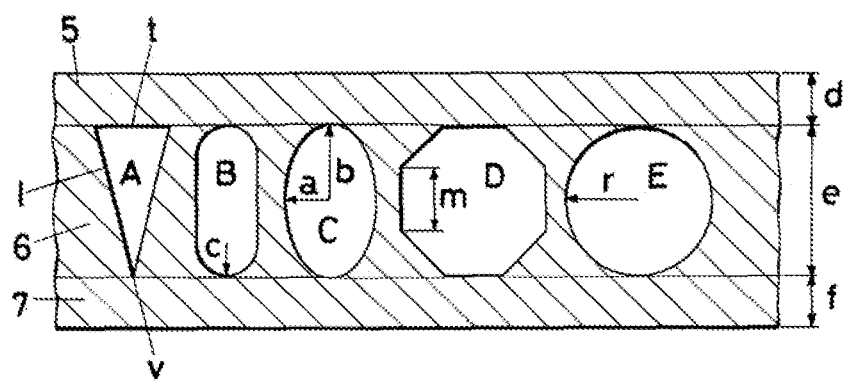
FIG.3
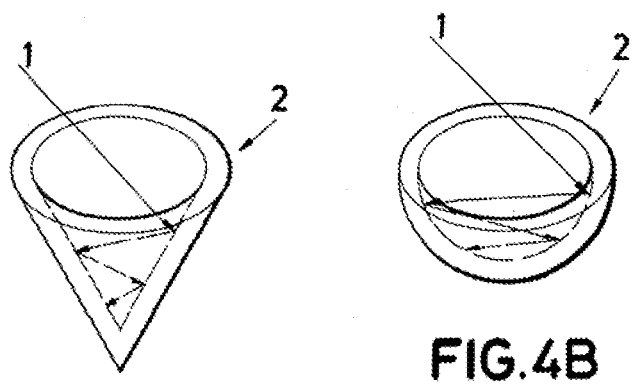
FIG.4A
FIG.4B
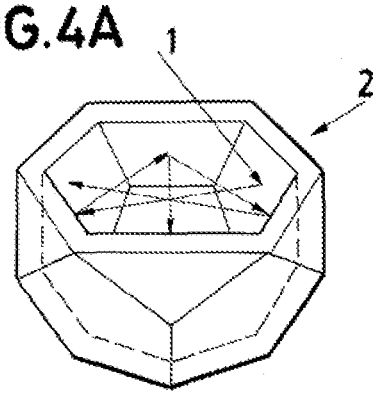
FIG.4C

SOLAR RADIATION RECEIVER

CROSS-REFERENCES TO RELATED APPLICATIONS

This application claims the benefit of the Spanish patent application No. 201131334 filed on Aug. 1, 2011, the entire disclosures of which are incorporated herein by way of reference.

BACKGROUND OF THE INVENTION

The present invention discloses a solar radiation receiver, applicable to the conversion of solar energy into thermal and electrical energy. Its use has a relevant interest in the power generation industry.

Currently there are three big technologies exploiting solar energy to turn it into thermal and electrical energy, cylinder-parabolic receivers, tower solar system with heliostat field, and parabolic dishes. The present invention is centered in the latter technology, wherein solar radiation strikes on a paraboloid (a "parabolic dish", that is usually a paraboloid with a circular section), and a heat machine is located at its focus. This heat machine is usually a perfected Stirling engine (initially described by Robert Stirling in his patent of 1816, see document GB 4081 A.D. 1816) which operates between a hot focus (a solar radiation receiver) and a cold focus. The mechanical energy that the Stirling engine or an equivalent engine, produces, actuates an alternator that generates electrical energy.

As aforementioned, in the systems with parabolic dishes the solar radiation is received on the receiver. Said receiver heats a working gas, which actuates the heat engine. For a given thermal energy, increasing the receiver performance involves increasing the working gas temperature, and consequently, increasing the engine performance. This causes the total performance of the machine to be more efficient.

The Stirling engines that have been used in these solar plants have utilized receivers formed by a tube bundle, which is located facing the paraboloid axis. However, in this configuration, the surface which has been used by the thermal energy coming from the concentrator (the parabolic dish), is only a percentage of the concentrator projection. Besides, the tube bundles that are used in the state of the art are devices made up of a plurality of pieces, which are welded to each other and to the collector. This type of welded construction generates, relatively often, mechanical tension problems when the device is subjected to thermal cycles, which many times result in material stressing and its subsequent breaking. On the other hand, it is quite common that those devices that follow the Stirling cycle use hydrogen as the working fluid to improve their performance. Given that H2 burns in contact with the air, the shapes provided for in the current state of the art imply a risk of fire and explosion.

To solve the aforementioned problems, the present invention proposes a solar receiver (that in some shapes it is flat, and in others it is not), that uses the entire projected surface of the concentrator, so the used area is maximum. Moreover, its construction is more robust and safer than the tube bundle solution that has been typically used up to now, since it avoids the currently existing problems arising from the welded joints of the different components.

Diverse shapes of solar receivers linked to Stirling engines are known in the current state of the art there. Thus, document GB 2296047 A1 describes a Stirling engine with a crankshaft over which a structure is assembled, and a series of flexible diaphragms defining the working chambers, hot and cold, wherein the working fluid flows, is linked thereto. Document CN 201433829 Y discloses a heat cavity absorber for the Stirling engine of a solar device, with U-shaped channels.

Document U.S. Pat. No. 4,114,597 A discloses a unitary solar collector for transfer of thermal energy which is a synthetic thermoplastic unit. The unit has a solar-energy transmitting region and a solar-energy absorbing regions. The unit is useful for heating purposes.

However, no device with the specific characteristics shown by the present invention has been disclosed.

SUMMARY OF THE INVENTION

The described invention discloses a solar radiation receiver that has inlet and outlet collectors, and a series of conduits that go from the inlet collector to the outlet collector, and through which such conduits a working fluid flows that is heated upon receiving solar radiation. The receiver comprises: a) an upper layer where the solar radiation strikes; b) at least one intermediate layer, located under the upper layer, where the conduits, through which the working fluid flows, are placed; and c) a lower layer, located under the at least one intermediate layer, into which the inlet and outlet collectors for the working fluid are coupled. The device construction is carried out in such a way that the upper layer, the at least one intermediate layer, and the lower layer, make up one single piece.

The conduits through which the working fluid flows, have either a triangular section, or a rectangular one with rounded ends, or elliptical, or regular polygonal, or circular, or a combination of two of the aforementioned geometries.

When there is more than one intermediate layer in the receiver, each of these intermediate layers is provided in the inside thereof with conduits through which the working fluid flows.

The conduits that are located in the intermediate layer(s) are arranged laid out like a labyrinth, covering the whole used surface of the intermediate layer(s) of the receiver.

Said piece from which the receiver is made, is an alloy capable of withstanding high temperatures, above 600° C., like steel, stainless steel or alloys like Inconel® or Hastelloy®.

The receiver can be shaped according to different geometrical shapes, exhibiting some of these configurations geometries such as: circular or circular sector, hollow semi-cone, hollow semi-sphere or a hollow polyhedron cut in half.

BRIEF DESCRIPTION OF THE DRAWINGS

The invention is easily understood in view of the contents of the specification together with the figures, in which numerical references are used to indicate the different elements that form the invention.

FIG. 3 is a detailed view of the receiver section, wherein the different shapes of the conduits are shown.

FIG. 4 shows other shapes as alternatives to the flat receiver shape, such as a semi-cone shaped receiver (FIG.

4A), hemisphere-shaped (FIG. 4B) or with the shape of a regular polyhedron cut in half (FIG. 4C) like a dodecahedron.

Next a list is provided with the different elements represented in the figures that form the invention: 1=solar radiation (direct or reflected); 2=receiver; 3=heat engine coupled to the parabolic dish; 4=alternator; 5=upper layer; 6=intermediate layer; 7=lower layer; 8=conduits; 9=inlet and outlet collectors of the working fluid; 10=solar radiation concentrator; a=semi-minor axis of the ellipse; b=semi-major axis of the ellipse; c=radius; d=thickness of the upper layer; e=thickness of the intermediate layer; f=thickness of the lower layer; m=side of the polygon; r=radius of the circle; t=basis of the conduit; I=sides of the conduit; v=conduit vertex.

DETAILED DESCRIPTION OF THE PREFERRED EMBODIMENTS

Figure 1:
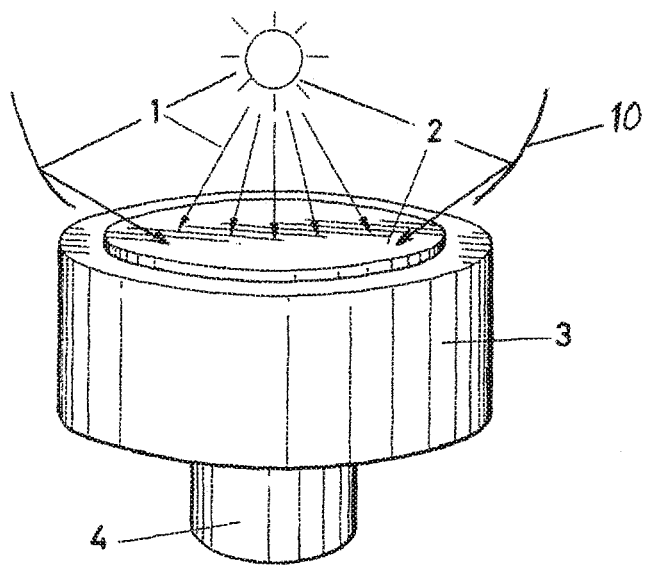
FIG. 1 is a schematic view of an external combustion heat engine applicable to heliothermal devices with parabolic dishes.

As it has already been stated, and as it can be seen in FIG. 1, the invention consists of a solar receiver applicable in heliothermic parabolic dishes that use external combustion engines. A Stirling engine (3) or the like is located in the focus of a solar radiation concentrator (10), such as a parabolic dish; the heat engine (3) has a solar radiation (1) receiver (2), with a series of channels through which a working fluid (usually H2) flows, and a set of coolers-regenerators. All these elements are assembled over an engine base as the state of the art documents disclose, and that is why they have not been shown in FIG. 1. Usually each cylinder arrangement of the heat engine (3) has a cooler, a regenerator and a receiver (2) connected thereto; in this case, the receiver (2) has a "flat" shape with a disc or circle shape, even though other arrangements are also possible, as it will be described hereinafter.

The working fluid that flows in the heat engine (3) reaches the solar receiver (2) when a heat engine (3) cycle has been completed; this way, and due to the heat transfer processes taking place in the receiver (2) upon receiving the solar radiation (1), the working fluid increases its enthalpy and then it is directed to the Stirling heat engine (3) where it flows. The working fluid expands in the heat engine (3), providing movement to the crankshaft or the like (not shown), which actuates an alternator (4) thus producing electric energy. Therefore, the purpose of the receiver (2) is to increase the enthalpy of the working fluid, which flows cyclically in the heat engine (3) to produce electricity through an alternator (4).

The receiver (2) receives solar radiation (1) by reflection on the internal surface of the paraboloid, given that said receiver (2) is located at the focus of the parabolic dish (10), and oriented towards the paraboloid. Therefore, the solar radiation (1) reaching the parabolic dish concentrates on its focus, heating the receiver (2) uniformly. Alternatively, the radiation can reach the receiver through concentration lenses such as Fresnel-type or the like.

Figure 2:
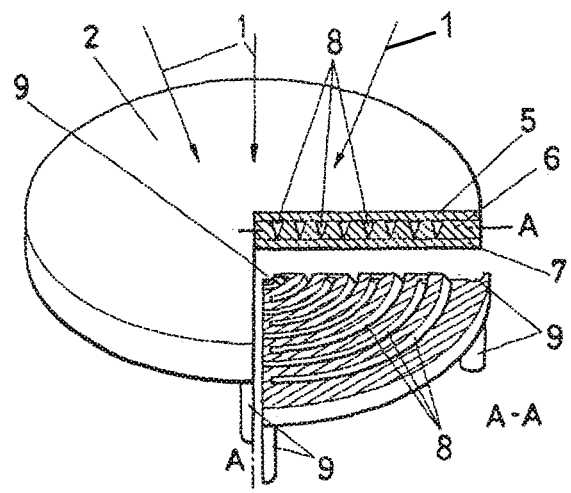
FIG. 2 is a perspective view of a receiver, in its flat shape, with a partial section, wherein the conduits through which the working fluid flows can be observed.

FIG. 2 represents a view of the receiver (2), wherein one of its quarters is sectioned. Said section is in turn cut along a plane AA to show the conduits (8) through which the working fluid that is heated in the receiver (2) flows, and then said fluid flows into the Stirling heat engine (3) or the like. The receiver (2) is provided with a series of collectors (9) through which the working fluid enters and exits. Initially, the working fluid coming from the Stirling engine (3) reaches one of the inlet collectors (9), flows through the conduits (6) of the receiver (2), being heated due to the incident solar radiation (1) striking the receiver (2). Once it has covered the path described by the conduit (6), the working fluid leaves the receiver (2) going to the Stirling engine (3) through which the according outlet collector (9), said working fluid flowing into the engine (3).

The receiver (2) is an element made of one single piece, even though given its structure a hypothetical discretization in three layers or strata can be carried out, as it can be observed in FIG. 2 and, in more detail, in FIG. 3. There is a first upper layer (5) whose external part is the one receiving solar radiation (1), since that external part is the surface of the receiver (2). Said upper layer (5) has a thickness "d". Under the first upper layer (5) there is, at least, one intermediate layer (6), with a thickness "e", although other embodiments can include more than one of said intermediate layers (6). In any case, each and every one of the intermediate layers (6) are provided with conduits (B) through which the working fluid flows towards the Stirling engine (3). For the purpose of making the invention clear, in FIGS. 2 and 3 only one single intermediate layer (6) has been shown. Finally a lower layer (7), with thickness "f", is arranged under the intermediate layer (6).

Schematically, the heat transfer process is as follows: as the solar radiation (1) strikes the receiver (2) surface, thus heat is transferred by conduction along the upper layer (5). Next, said transfer by conduction is transmitted to the rest of the elements of the receiver (2): along the existing intermediate layers (6), down to the lower layer (7), and towards the conduits (B). Therefore, the working fluid that flows into the conduits (B) increases its enthalpy due to the heat transfer that is now received by convection, and, to a lesser degree, also due to radiation. The shape of the conduits (6) along the intermediate layer(s) (6) is labyrinthine, to increase the path thereof with respect to the used surface of the receiver (2) and thus to optimize the heat transfer. Therefore, most of the heat transfer takes place from all the layers (5, 6, 7) towards the fluid flowing through the conduits (B). Even so, part of the heat is still transferred towards the lower layer (7) area. As those skilled in the art very well know, other heat transfer phenomena by radiation and convection to the atmosphere along the entire surface of the receiver (2) also take place, even though said processes can be considered less significant than the heat transfer from the different layers (5, 6, 7) to the fluid flowing through the conduits (8).

FIGS. 2 and 3 show (the latter with more details than the former) possible embodiments of the geometry conduits (8). For the purpose of simplifying the description, five embodiments of the conduits (8) section have been shown (FIG. 3), these shapes being: A, triangular; B, rectangular with rounded ends; C, elliptical; D, regular polygonal; and E, circular. Section A has a triangular shape (typically isosceles), with a base (t) and sides (1) converging at a vertex (v), pointing towards the lower layer (7). Section B has a rectangular shape, with a side "e" equal to the thickness of the intermediate layer (6), even though the top and the bottom end in a semicircle of radius "c". Section C is an ellipse with a semi-minor axis "a" and semi-major axis "b". Section D is a regular polygon with side "m"; in the case of FIG. 3, a regular octagon has been shown. Section E is a circle with a radius "r". Experience has shown that the geometries of these conduits (8) are the most adequate according to diverse physical parameters of the working fluid, like the Reynolds number, the velocity, its pressure, and its temperature.

Only some of the five configurations (A, B, C, D, or E) which are shown in FIGS. 2 and 3, or combinations thereof, are provided; for instance, a conduit half polygonal—half circular, or other possible combinations based on the configurations A, B, C, D, or E. FIG. 3 represents all the initial configurations over the same receiver, to show the possible alternatives, but it must be understood that for a given receiver (2), the geometry of the conduits (8) is only one of the options A to E shown (or combinations thereof).

Experimentally it has been proven that the best option to manufacture the receiver (2) is by means of an additive layer manufacturing process. In such a way that the upper layer (5), the intermediate layer(s) (6) and the lower layer (7) are manufactured in one single piece; said piece is, preferably, made in an alloy capable of withstanding high temperatures, above 600° C. Experimentally it has been proven that adequate materials capable of withstanding these heat loads are steel, stainless steel, or alloys like Inconel® or Hastelloy®.

It is possible to provide different embodiments of solar receivers (2), sometimes keeping the previously explained disc geometry or with other geometrical shapes like those described hereinafter. If a disc geometry is used, it is possible to shape the solar receiver (2) either like a complete circle, or like circular sectors, like one quarter of a circle sector, one eighth of a circle sector or other submultiples. Thus, the solar receiver (2) that can be seen in FIG. 2 can be valid, in its entirety, for a Stirling engine (3), or it could be that the sectioned circle quadrant of said FIG. 2 can be used to feed a cylinder of said Stirling engine (3). In any case, as any person skilled in the art may understand, the chosen embodiment does not affect the configuration explained herein, or the essence of the invention.

FIG. 4 shows other possible embodiments of the receiver (2) with geometries differing from the dish shown in FIG. 2. Thus, FIG. 4A shows a receiver with a shape of a hollow semi-cone, in such a way that solar radiation (1) strikes inside the semi-cone, said radiation (1) being reflected along the semi-cone surface. Inside the walls of the semi-cone the structure of the conduits (8), described for the receiver of FIG. 2, is repeated, which have not been shown in FIG. 4 for purposes of clarity. Other geometrical shapes are also possible, like a hollow hemisphere, as shown in FIG. 4B, wherein solar radiation (1) also strikes the internal surface of the hemisphere, heating it, and then, heating the working fluid which flows in the internal conduits (not shown). FIG. 4C shows a last embodiment of the receiver (2), in the configuration of a hollow regular polyhedron, like for instance, an octahedron, dodecahedron, icosahedra or other polyhedrons Similarly, to the preceding cases, solar radiation (1) strikes the internal walls of the polyhedron, enduring successive reflection processes and heating the internal surface of the polyhedron. When heated, these walls carry out the heat transfer to the fluid that flows inside them, in the, already explained, corresponding conduits (and not shown in FIG. 4).

Any person skilled in the art will understand the scope of the invention and the advantages derived thereof. The terms used to describe the invention must be taken in the broad and not limiting sense, the main distinctive features of this invention being described in the following claims.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. A solar energy collector comprising:
    a radiation receiver,
        a heliothermal parabolic dish that has a heat engine located at its focus,
    the radiation receiver being located in the focus of the parbolic dish and comprising:
        inlet and outlet collectors,
        a series of conduits going from the inlet collector to the outlet collector through which a working fluid flows, such working fluid being heated when receiving solar radiation;
        an upper layer having a surface which is struck directly by solar radiation, including radiation reflected from the parabolic dish;
        at least one intermediate layer, located under the upper layer, where conduits, through which the working fluid flows, are arranged laid out like a labyrinth, covering a whole used surface of the at least one intermediate layer of the receiver;
        a lower layer, located under the at least one intermediate layer, into which the inlet and outlet collectors for the working fluid are coupled;
        wherein the upper layer, the at least one intermediate layer with the conduits and the lower layer, are made up in one single piece and said piece is made from an alloy that withstands temperatures above 600° C.

2. The solar energy collector according to claim 1, wherein the conduits, through which the working fluid flows, have a shape that can be at least one of triangular, rectangular with rounded ends, elliptical, regular polygonal, circular, or combinations of two or more of the aforementioned geometries.

3. The solar energy collector according to claim 1, wherein in the event that there is more than one intermediate layer, each of said intermediate layers is provided in its interior with conduits through which the working fluid flows.

4. The solar energy collector according to claim 1, wherein the receiver is shaped with one of circular or circular sector geometry.

5. The solar energy collector according to claim 1, wherein the receiver is shaped with the geometry of a hollow cone.

6. The solar energy collector according to claim 1, wherein the receiver is shaped with the geometry of a hollow hemisphere.

7. The solar energy collector according to claim 1, wherein the receiver is shaped with the geometry of half a hollow polyhedron.

8. The solar energy collector according to claim 1, wherein the working fluid is hydrogen.

9. A solar energy collector comprising:
    a radiation receiver,
        a solar radiation concentrator that has a heat engine located at its focus,
    the radiation receiver being located in the focus of the solar radiation concentrator and comprising:
        inlet and outlet collectors,
        a series of conduits going from the inlet collector to the outlet collector through which a working fluid flows, such working fluid being heated when receiving solar radiation;
        an upper layer having a surface which is struck directly by solar radiation, including radiation concentrated by the solar radiation concentrator;
        at least one intermediate layer, located under the upper layer, where conduits, through which the working fluid flows, are arranged laid out like a labyrinth, covering a whole used surface of the at least one intermediate layer of the receiver;
        a lower layer, located under the at least one intermediate layer, into which the inlet and outlet collectors for the working fluid are coupled;

wherein the upper layer, the at least one intermediate layer with the conduits and the lower layer, are made up in one single piece and said piece is made from an alloy that withstands temperatures above 600° C.

10. A solar energy collector comprising:
a radiation receiver,
a solar radiation concentrator having a heat engine located at its focus,
the radiation receiver being located in the focus of the solar radiation concentrator and comprising:
inlet and outlet collectors,
at least one conduit extending from the inlet collector to the outlet collector and arranged to direct a flow of a working fluid;
an upper layer having a surface which is struck by solar radiation concentrated by the solar radiation concentrator;
at least one intermediate layer, located under the upper layer, where the conduits, through which the working fluid flows, are arranged laid out like a labyrinth;
a lower layer, located under the at least one intermediate layer, into which the inlet and outlet collectors are coupled with the at least one conduit;
wherein the upper layer, the at least one intermediate layer with the at least one conduit and the lower layer, are made up in one single piece and said piece is made from an alloy that withstands temperatures above 600° C.

11. The solar energy collector according to claim 10, wherein the at least one conduit, through which the working fluid flows, has a shape that is at least one of triangular, rectangular with rounded ends, elliptical, regular polygonal, circular, or combinations of two or more of the aforementioned geometries.

12. The solar energy collector according to claim 10, wherein in the event that there is more than one intermediate layer, each of said intermediate layers is provided in its interior with at least one conduit for directing a flow of working fluid.

13. The solar energy collector according to claim 10, wherein the receiver is shaped with one of circular or circular sector geometry.

14. The solar energy collector according to claim 10, wherein the receiver is shaped with the geometry of a hollow cone.

15. The solar energy collector according to claim 10, wherein the receiver is shaped with the geometry of a hollow hemisphere.

16. The solar energy collector according to claim 10, wherein the receiver is shaped with the geometry of half a hollow polyhedron.

17. The solar energy collector according to claim 10, wherein the working fluid is hydrogen.

* * * * *